United States Patent [19]

Tolley et al.

[11] Patent Number: 4,853,205

[45] Date of Patent: Aug. 1, 1989

[54] SUPERCRITICAL FLUID METAL HALIDE SEPARATION PROCESS

[75] Inventors: William K. Tolley, Salt Lake City; Alton B. Whitehead, Sandy, both of Utah

[73] Assignee: The United states of America as represented by the Secretary of the Interior, Washington, D.C.

[21] Appl. No.: 25,252

[22] Filed: Mar. 12, 1987

[51] Int. Cl.$^4$ ............................ C01B 9/00; C01B 9/02; C01F 7/62; C01G 23/02
[52] U.S. Cl. ........................................ 423/472; 423/64; 423/65; 423/85; 423/122; 423/123; 423/140; 423/141; 423/489; 423/491; 423/492; 423/493; 423/495; 423/DIG. 11
[58] Field of Search ............... 423/495, 491, 492, 493, 423/494, DIG. 11, 131, 68, 86, 150, 472, 489, 490, 497, 498, 64, 65, 69, 85, 122, 123, 140, 141; 55/71

[56] References Cited

U.S. PATENT DOCUMENTS

| | | | |
|---|---|---|---|
| 1,582,131 | 4/1926 | Danner | 423/130 |
| 1,760,962 | 6/1930 | Phillips et al. | 423/130 |
| 3,906,077 | 9/1975 | Rado et al. | 423/148 |
| 4,283,371 | 8/1981 | Rado | 423/135 |
| 4,457,812 | 7/1984 | Rado | 423/494 |

Primary Examiner—John Doll
Assistant Examiner—Jeffrey Edwin Russel
Attorney, Agent, or Firm—E. Philip Koltos

[57] ABSTRACT

Process of using supercritical fluid to selectively separate, purify and recover metal halides.

6 Claims, No Drawings

SUPERCRITICAL FLUID METAL HALIDE SEPARATION PROCESS

BACKGROUND OF THE INVENTION

There is increasing desire to find efficient and economical means for separation of high purity metal halides such as those of titanium, aluminum, gallium, silicon, etc. from domestic ores, and become less dependent on imported ores for these materials.

In the carbochlorination process for producing aluminum from clay, which is the largest domestic source of aluminum, the resulting aluminum chloride product normally contains from about 5 to about 10% titanium tetrachloride as a contaminant. Moreover, the use of distillation as a method of separating titanium tetrachloride from aluminum chloride has proven to be impossible because these compounds have similar vapor behavior at these low concentrations of titanium tetrachloride.

Documentation of the problems encountered in separating titanium tetrachloride from aluminum chloride is presented by A. Landsberg and H. C. Ko in an article entitled—*On The Separation Of Titanium Tetrachloride From Aluminum Chloride,* Met. Trans. B, vol. 17B, March, 1986, pp. 232-234.

One alternative to the distillation separation process is the selective condensation process, which uses a molten halide mixture as an absorbing bath; however, the procedure is encumbered by the disadvantage of requiring several subsequent distillation steps to recover the metal chlorides and regenerate the bath.

A second alternative to the distillation separation process is to absorb the metal chlorides in an aqueous solution and purify them by using standard hydrometallurgical methods; however, the disadvantages attendant to this process are that it occasions high energy consumption and gives rise to larger chlorine losses than the nonaqueous method. This is documented by S. J. Weiss in *Recovery and Separation Of Products From The High-Temperature Chlorination of Fly Ash,* Masters Thesis, Iowa State University, Ames, Iowa, 1980, pp. 32-58.

Further disadvantages in processes of separating aluminum chloride in the process of obtaining aluminum is that small amounts of ferric chloride are often times present, and this requires a large number of distillation steps to obtain acceptable aluminum purity. Also, in spite of the large number of distillation steps, some aluminum chloride is lost. Problems associated with this are treated by H. C. Ko, A. Landsberg, and J. L. Henry in *The Vapor-Liquid Equilibria of the Aluminum Chloride-Ferric Chloride System,* Met. Trans, B, vol. 14B, 1983, pp. 301-303.

In related processes of obtaining titanium, the titanium is often recovered from ilmenite or rutile ore by chlorination, and the resulting $TiCl_4$ is purified by distillation, which has high energy requirements and cannot reject vanadium compounds. While various organic chemicals have been employed to prevent vanadium compounds from distilling along with the $TiCl_{14}$, these organic compounds require several hours of contact under reflux to become effective and often leave undesirable compounds mixed with the $TiCl_4$. See G. J. Dooley III, *Titanium Production: Ilmenite vs. Rutile,* J. Metals, Mar. 1975, pp. 8-16; also J. Barksdale, *Titanium,* The Ronald Press Co., 1949, 591 pp.

The invention's discovery is that, in certain supercritical fluids or solvents, $TiCl_4$ is more soluble than aluminum chloride, and both of these compounds are more soluble than ferric chloride. Similarly, $TiCl_4$, which has no permanent dipole is more soluble than $VOCl_3$, which is polar.

Utilizing this discovery, the invention process employs supercritical fluids for recovering, separating and/or purifying metal halides.

The process of the invention may be used to purify titanium tetrachloride, which is needed to provide high-purity titanium metal for aerospace applications. The process of the invention may be used to purify aluminum chloride, which may provide aluminum metal for aerospace applications. Purification of materials important to the electronics industry, such as gallium and silicon may be also accomplished by this method.

The invention process can also be utilized to remove the above-mentioned metal halides from waste streams where the metal halides will cause harm to the environment if left combined with the wastes.

SUMMARY OF THE INVENTION

It is an objective of the present invention to utilize a supercritical fluid for recovering, separating, and purifying metal halides.

A further objective of the present invention is to utilize a supercritical fluid for separation of metal halides, that will require fewer separation steps and yet obtain a higher degree of metal halide purity.

A yet further objective of the present invention is to utilize a supercritical fluid to separate metal halides that cannot be separated by other means.

A still further objective of the present invention is to provide a supercritical fluid for separation of metal halides, wherein said halides are totally recovered from undesirable residues, and no product remains mixed with discarded waste.

Finally, it is a further objective of the present invention to provide a supercritical fluid method having lower energy consumption in the production of metals, because the metals can be produced from their halide compounds with less energy than if produced from hydrated compounds.

These and other objectives of the invention will be better understood by the descriptions hereinafter set forth.

DETAILED DESCRIPTION OF THE INVENTION

The point of temperature and pressure at which the liquid and gaseous states of matter become totally miscible is referred to as the critical point. At the critical point, the densities of the liquid and gaseous states are identical.

In the context of this invention, temperatures and pressures above the critical point of a fluid are deemed supercritical points, and fluids under these conditions are deemed supercritical fluids. This solubility of a specific compound in a supercritical fluid is known to relate to the compound's polarity, boiling temperature and formula weight.

In general, the invention process of separating, recovering and purifying metals following conversion of the metal values to halide compounds entails, dissolving the metal as a halide in a supercritical fluid.

This is accomplished by placing a mixture containing the metal halides in an autoclave. A supercritical fluid is then passed through the metal chloride mixture. The supercritical fluid carrying the dissolved metal chloride is continuously removed during this period and subjected to heating, cooling and/or depressurizing to effect partial or complete precipitation of the metal halide. Metal halide precipitated from the fluid is captured in a vessel. After all of the metal halide has accumulated, it may be analyzed, and any solid metal halide residue remaining in the autoclave after extraction with the supercritical fluid similarly may be analyzed to ensure completeness of the separation.

By this process, using a single concentration step, a mixture containing metal chlorides can be upgraded to two different metal chloride products of purities in excess of 90%.

EXAMPLE 1

54.5 g of a mixture containing 15.9% $TiCl_4$ and 84.1% $AlCl_3$ was placed in an autoclave. Supercritical $CO_2$ at 53° C. and 1,550 psig was passed through the chloride mixture for approximately 30 minutes. Supercritical $CO_2$ carrying dissolved $TiCl_4$ was removed continuously during this 30 minute period and depressurized by expanding it through a needle valve. Liquid $TiCl_4$ was precipitated from the $CO_2$ during depressurization and was captured in a flask. At the end of the test, it was found that 3.15 g of liquid had accumulated. This liquid was analyzed and found to contain 99.3% $TiCl_4$ and 0.7% $AlCl_3$. Solid $AlCl_3$ residue remained in the autoclave after the extraction with supercritical $CO_2$, and upon analysis it contained no detectable titanium.

Thus, in a single concentration step, a mixture of $TiCl_4$ and $AlCl_3$ was upgraded to two products of purities in excess of 99%.

While not wishing to be bound by any theory, it is nevertheless believed that the theory of operation is that relatively volatile, nonpolar molecules such as $TiCl_4$ dissolve more readily in supercritical solvents than do less volatile, more polar molecules such as aluminum chloride.

While dissolution of the $TiCl_4$ from aluminum chloride in $CO_2$ has taken place at conditions ranging from 0 to 2,000 psig and at 25° to 140° C., the preferred operating conditions are 1,200 to 1,600 psig and 50° to 55° C., which is slightly above the critical point. And although higher pressures and lower pressures may be employed for this separation, it has been found that such pressures reduce the effectiveness of the separation.

Other fluids or gases in the supercritical state may be employed as the solvent, and include ethane, propane, fluorocarbons, pentane, chlorofluorocarbons, and other halogenated carbon compounds. Carbon dioxide as the preferred fluid and the supercritical fluid can be a single one of these fluids, or a mixture of the fluids.

Oxygenated carbon compounds such as ethers, ketones or alcohols can not be used because these tend to react vigorously with metal halides. Similarly, fluids such as water, methanol, acetone and nitrous oxide tend to react with the metal halides to produce metal oxides, when these fluids are used as supercritical solvents. Therefore, these fluids are to be avoided.

Greater solubility of a given metal halide over another in a supercritical fluid is not sufficient per se for purposes of separation and purification, however; greater solubility coupled with stability of the metal halide solution in the supercritical solvent has given rise to superior means for separating, recovering and purifying the metal halides from a mixture.

EXAMPLE 2

A mixture of 13.0% $TiCl_4$, 65.3% $AlCl_3$ and 21.7% $FeCl_3$ was placed in an autoclave. Supercritical $CO_2$ at 55° C. and 1,600 psig was passed through the mixture. A liquid condensate captured from the $CO_2$ leaving the autoclave was found to contain 99.5% $TiCl_4$ and 0.5% $AlCl_3$. It was found that the titanium content of the solid residue was not measurable. Thus, even complex mixtures containing more than two metal chloride compounds can be separated by this method.

EXAMPLE 3

Same as Example 1, except that ferric chloride instead of $TiCl_4$ is contained in the mixture, and the pressure of the $CO_2$ is 2,300 psig. The preferred conditions for aluminum chloride dissolution in the mixture are from about 45° to about 60° C. and from about 2,000 to about 5,000 psig.

EXAMPLE 4

Same as Example 1, except that gallium chloride instead of $TiCl_4$ is contained in the mixture.

Gallium chloride can be separated over a temperature range of 15° to 400° C. and a pressure range of from about 700 to about 25,000 psig.

EXAMPLE 5

Same as example 1, except that $VOCl_3$ instead of $AlCl_3$ is contained in the mixture.

While many advantages are apparent from the invention, the principal advantage of the invention method for purifying metals is the high selectivity of the separation, as shown in the examples. Several benefits to metallurgical processing by using a supercritical solvent are:

A. few separation steps are required to obtain the required purity of the metal;

B. metal separations are possible by this method that cannot be effected by other means;

C. the valuable product can be recovered totally from the undesirable residues, and no product remains mixed with discarded waste; and D. lower energy is consumed in the production of the metals because metals may be produced from halide compounds with less energy than if produced from hydrated compounds.

Although the invention employs a supercritical fluid for recovering, separating, and purifying metal halides in the production of metal products, the metal halides produced by this method can also be used in the production of highly pure metals or other products such as pigments or ceramics.

Moreover, even though the specific examples disclose separation of the chloride metal salts, the process is equally applicable to all of the halide metal salts.

What is claimed is:

1. A process for separating, purifying and recovering metal halide from a mixture, using supercritical fluids comprising:

placing a mixture containing metal halides in an autoclave;

passing a supercritical fluid selected from the group consisting of carbon dioxide, ethane, propane, fluorocarbons, pentane, chlorofluorocarbons, and mixtures thereof at temperatures from about 15° to about 400° C. and at pressures from about 700 to about 25,000 psig through the mixture;

removing said supercritical fluid and a more soluble metal halide dissolved in said supercritical fluid;

altering process variables selected from the class of temperature and pressure to effect precipitation of the more soluble metal halide dissolved in said supercritical fluid; and recovering the less soluble metal halide residue remaining in the autoclave.

2. The process of claim 1, wherein the mixture contains $TiCl_4$ and $AlCl_3$, the supercritical fluid is $CO_2$, the temperature is 53° C., and the pressure is 1,550 psig.

3. The process of claim 1, wherein the mixture contains $TiCl_4$, $AlCl_3$ and $FeCl_3$, the supercritical fluid is $CO_2$, the temperature is 55° C., and the pressure is 1,600 psig.

4. The process of claim 1, wherein the mixture contains $AlCl_3$ and $FeCl_3$, the supercritical fluid is $CO_2$, the temperature is 55° C. and the pressure is 2,300 psig.

5. The process of claim 1, wherein the mixture contains aluminum chloride and gallium chloride, the supercritical fluid is $CO_2$, the temperature is 53° C., and the pressure is 1,550 psig.

6. The process of claim 1, wherein the mixture contains $VOCl_3$ and $TiCl_4$, the supercritical fluid is $CO_2$, the temperature is 53° C., and the pressure is 1,550 psig.

* * * * *